INVENTOR
Toshio Shiraiwa
Sumio Kobayashi
BY
Watson, Cole, Grindle & Watson
ATTORNEY

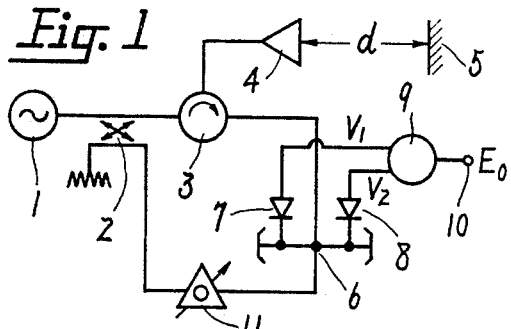
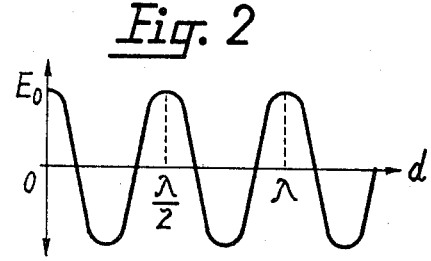
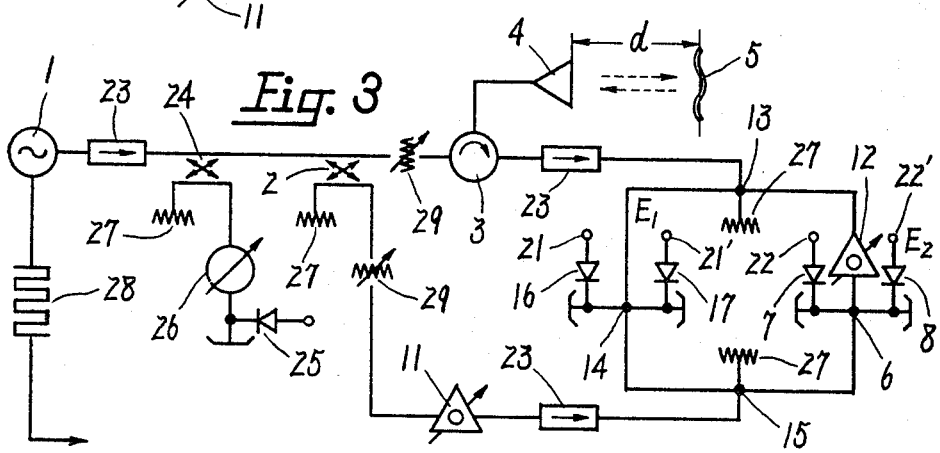
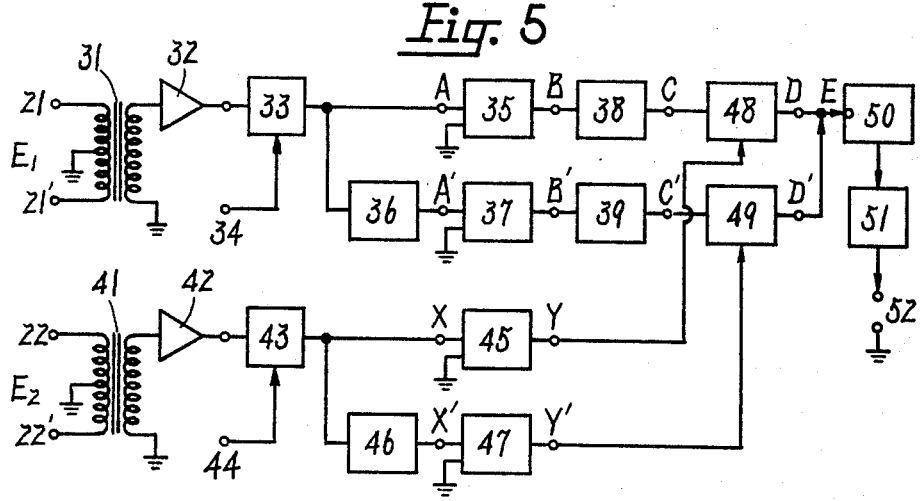

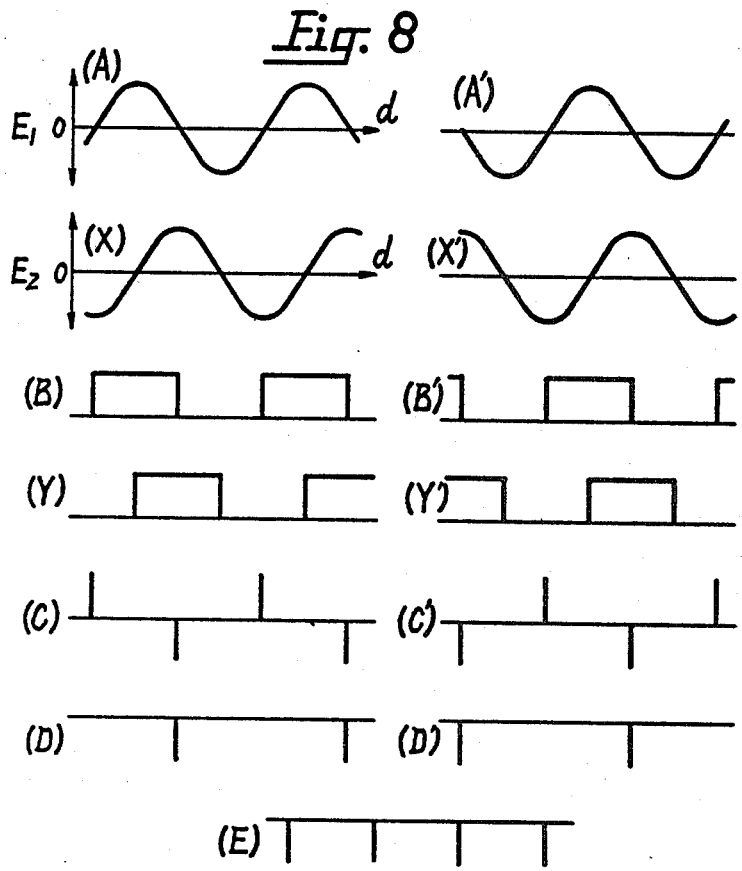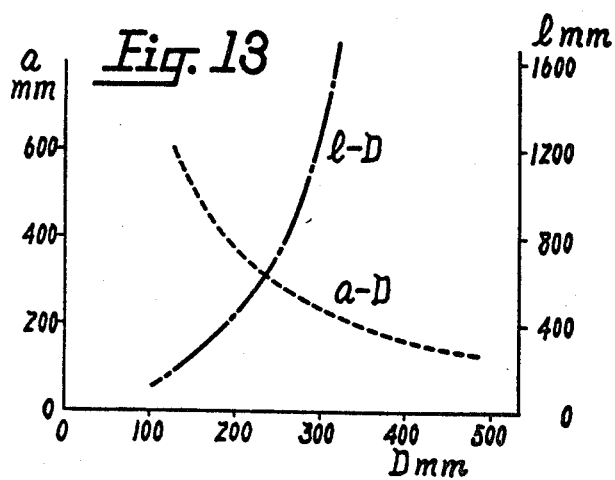

United States Patent Office 3,509,751
Patented May 5, 1970

3,509,751
METHOD AND APPARATUS FOR DETECTING LOCAL IRREGULARITIES ON STRIPS AND CONTROLLING THE EVENNESS OF STRIPS
Toshio Shiraiwa, Nara Prefecture, and Sumio Kobayashi, Mino, Japan, assignors to Sumitomo Metal Industries Ltd., Osaka, Japan
Filed Mar. 21, 1968, Ser. No. 714,903
Claims priority, application Japan, Mar. 30, 1967, 42/20,135
Int. Cl. B21b *37/00*
U.S. Cl. 72—16   8 Claims

ABSTRACT OF THE DISCLOSURE

This invention is for detecting such local irregularities on strips as frilly edges and slack bands and momentarily on line during rolling process by a non-contact system accurately with a microwave technique, and provides a method of controlling the evenness of strips while they are rolled by giving an instruction to an existing roll crown adjusting apparatus on the basis of the signal detected by the local irregularity detecting apparatus.

---

This invention relates to a method and an apparatus for detecting local irregularities on strips and for controlling the evenness of strips.

In a continuous rolling process of metal strips especially steel strips, it is very important but is considerably difficult from a technical view point to produce extremely flat strips. To get a perfect even sheet of determined dimensions, when it is placed on a surface plate, the reduction must be constant across the strip. Unless the reduction is kept constant, non-uniform elongation will be produced across the strip. If the strip elongates too much in the edge, such local irregularity as frilly edge will be produced. If it elongates too much in the middle, such local irregularity as a slack band will be produced. Anyhow no even strip will be obtained. Such local irregularities are corrected with a well known roll crown adjusting apparatus. For example, a hydraulic cylinder is provided between metal chocks of a work roll, and liquid pressure is applied to bend the work roll and is properly adjusted depending on the degree of the production of local irregularities so that an optimum roll shape may be kept. However, though the roll is automatically operated by using the roll crown adjusting apparatus, the criterion of the operation is after all the shape of rolled strip itself. Unless the momentary variation of the local irregularities is continuously detected and a feed back control of the strip is made, no perfectly even sheet will be obtained. Such local irregularities produced during the continuous rolling will cause defective products and therefore must be quickly detected and corrected during the rolling process.

A strip while being rolled runs at high speed and its temperature often reaches as high as 900° C. Therefore it is so difficult to detect directly its local irregularities during the rolling process that the detecting depends mostly on visual inspection. However, there is naturally a limit to the inspecting ability of the inspector, and the dicerence between the inspecting abilities of the individual is so wide that it is almost impossible to evaluate correctly the local irregularities produced on the strip. Therefore, we have already proposed a detecting method. Our previous invention relates to a method and an apparatus wherein a plurality of contactors are arranged in a line across a strip or only one contactor is fitted so as to be reciprocatable across the strip and such contactors are normally kept in contact with the strip under a fixed pressure in a continuous cold strip mill or in a skin pass mill so that the tension distribution across the strip may be electrically detected by varying the load applied to the contactors and its deviation from the basic tension may be made an input signal for the correction and the control. By this method, favorable results were obtained in the above mentioned continuous cold strip mill and the skin pass mill. But, it cannot be applied to a continuous hot strip mill. Therefore, the development of a detecting technique by a more improved non-contact system has been hoped for.

An object of this invention is to detect quantitatively such local irregularities as frilly edges and slack bands by using an electronic technique of a high accuracy so that the shape of the strip while being rolled may be inspected.

A second object is to convert the shape of strip to an electronic signal stably in non-contact and on line during the rolling process in a continuous mill with an electronic apparatus of high precision.

A third object is to give a detected signal of local irregularity on a strip while being rolled which is obtained by the above mentioned method and apparatus as an input signal for an existing roll crown adjusting apparatus so that the bending of the work roll may be automatically and continuously adjusted, and a strip of even flatness may be always provided.

In the accompanying drawings:

FIG. 1 shows a basic circuit indicating the principle of a microwave displacement measurement;

FIG. 2 shows a relative curve of an outpnt and displacement in the circuit in FIG. 1;

FIG. 3 shows a typical circuit of a microwave displacement meter used in the present invention for measuring local irregularities on a strip;

FIG. 5 is a block diagram of an electronic circuit for analyzing displacement outputs in FIGS. 3 and 4;

FIG. 8 is the same as in FIG. 7 but shows the case that a second input is more delayed in the phase than a first input;

FIG. 13 is a curve diagram showing the relative relation in FIG. 12.

Figure 4:
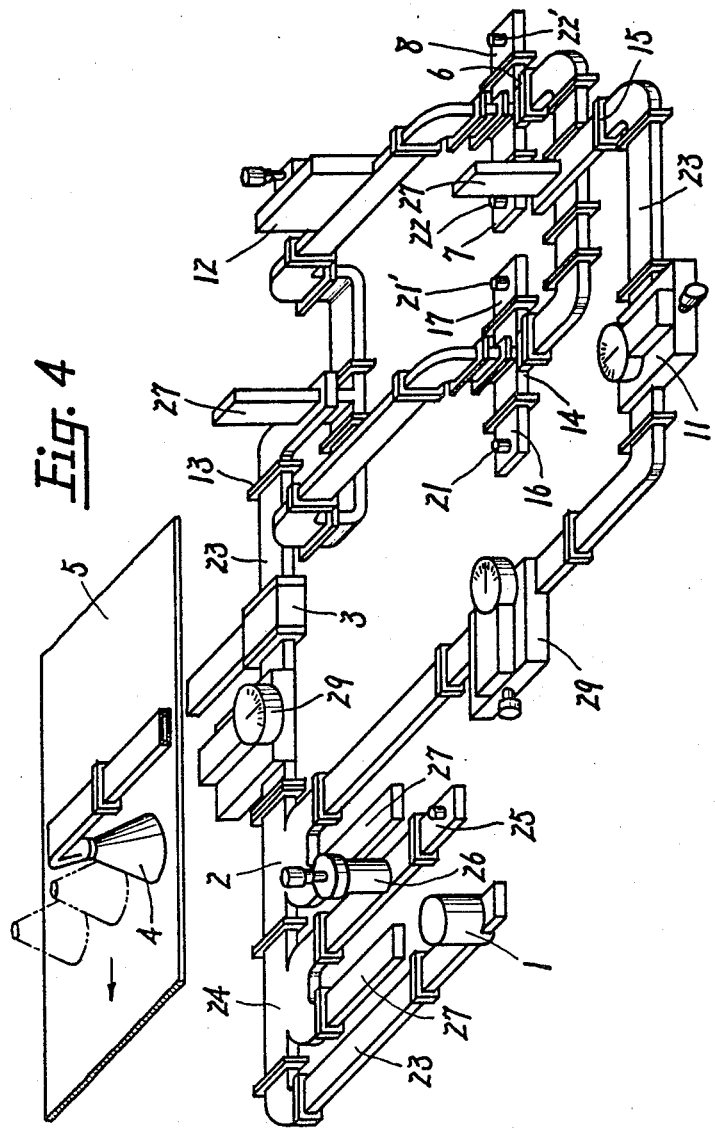
FIG. 4 is a perspective view of the microwave circuit in FIG. 3.

The size of such local irregularity as a frilly edge or a slack band produced while a strip is being continuously rolled is so remarkably larger than the size of the variation of the thickness of the strip that it can be detected by measuring the distance from a fixed basic position to the surface of the strip and by catching the state of the fluctuation of the distance. As the variation of the distanct from the above mentioned basic position to the surface of the strip is caused by the sum of the vertical deviation and local irregularity of the strip, the local irregularity on the strip can be detected by simultaneously measuring the displacements from the basic level in plural places on the strip and by comparing the displacement one another.

The present invention is based on the fact that microwaves used generally in the fields of meteorological radars and telecommunications can be applied to the measurement of such comparatively short displacements as are mentioned above and is to detect on line the size and position of a local irregularity on a strip while being continuously rolled from the fact that, when microwaves of a specific wave length are projected onto the surface of a strip, the phase shift of the reflected waves with respect to the transmitted waves is a function of the displacement.

Generally, in measuring comparatively short diplacements with high precision, there can be applied a microwave interferometer for measuring the amount of the phase shift of microwaves. A microwave interferometer is superior to an optical interferometer in the following various points that (1) the object to be measured may be either a conductor or an insulator, (2) the direction of the surface of the object for electric waves is not so strict as is required in the optical system and (3) the output can be easily obtained in the form of an electrical signal. More than two displacements across a strip as, for example, three respective points at both ends and in the middle part of the strip and antennas are simultaneously measured, and the size and the position of any local irregularity on the strip are detected by comparing the results of the measurements.

FIG. 1 shows the principle of a displacement measurement by phase shift. Therein, microwaves coming out of a microwave oscillator 1 are divided into two directions by a directional coupler 2. One part proceeds to a reference circuit and the other proceeds to the antenna 4 through a circulator 3, is reflected by an object 5 to be measured and returns. The sum and difference between the waves in the reference circuit and the waves in the antenna circuit are determined with a magic T 6 and are detected with square law crystal detectors 7 and 8 (the outputs of crystals are $V_1$ and $V_2$ respectively) and the difference of $V_1$ and $V_2$ is determined with an output meter 9 to obtain the output of the terminal 10. Needless to say, the reference circuit works for giving a basic phase for the phase shift of reflected waves from the object to be measured. As the phase of these reflected waves is determined by the displacement between the antenna and the object, the displacement of the object can be measured in this method. Further, a phase shifter 11 is for calibrating and is used to set a proper operating point in response to the distance to the object.

If the phase difference between the waves in the reference circuit and the waves in the antenna circuit is $\varphi$, and the wave form in the antenna circuit is $A.\cos(\omega t)$ and that in the reference circuit is $B.\cos(\omega t+\varphi)$, the outputs $V_1$ and $V_2$ from the crystal detectors 7 and 8 will be represented respectively by $$V_1=\tfrac{1}{2}(A^2+B^2+2AB.\cos\varphi)$$

and $$V_2=\tfrac{1}{2}(A^2+B^2-2AB.\cos\varphi)$$

If the difference between them is determined with the output meter 9, the output $E_0$ at the terminal 10 will be $$E_0=k.\cos\varphi$$

where $k$ is a constant determined by the level of the signal and the characteristics of the crystal detectors.

Now, if the free space wavelength of the microwave signals is $\lambda$ and the displacement of the object 5 is $d$, $\varphi$ will be $$\varphi=\frac{4\pi d}{\lambda}$$

Therefore, if the displacement $d$ is taken on the abscissa and the output of the circuit is taken on the ordinate, the given curve will be of a sinusoidal function of a cycle of $d=\lambda/2$ as in FIG. 2.

In FIG. 2, in case the detected displacement exceeds $\lambda/4$, the amount of the displacement will not be determined, with only the output value of the circuit so it will be necessary to get the absolute value of the phase shift by counting the number of the passed peaks. Further, unless whether the strip is in a direction (which shall be made $+$) in which it moves away from the antenna or in a direction (which shall be made $-$) in which it approaches the antenna is distinguished, the shape of the irregularity will not be detected.

In order to apply the present invention practically to workshops if the measurable range of displacements $\lambda/4$ (in FIG. 2) is now set to be 8 mm., the length $\lambda$ will be 32 mm. and the frequency of the microwave signals will be 9.375 gHz. ($=9375$ mHz.).

For example, in a continuous hot strip mill, as the wave height of the local irregularity often reaches 50 to 100 mm., it is necessary to count the numbers of waves in FIG. 2.

Figure 6:
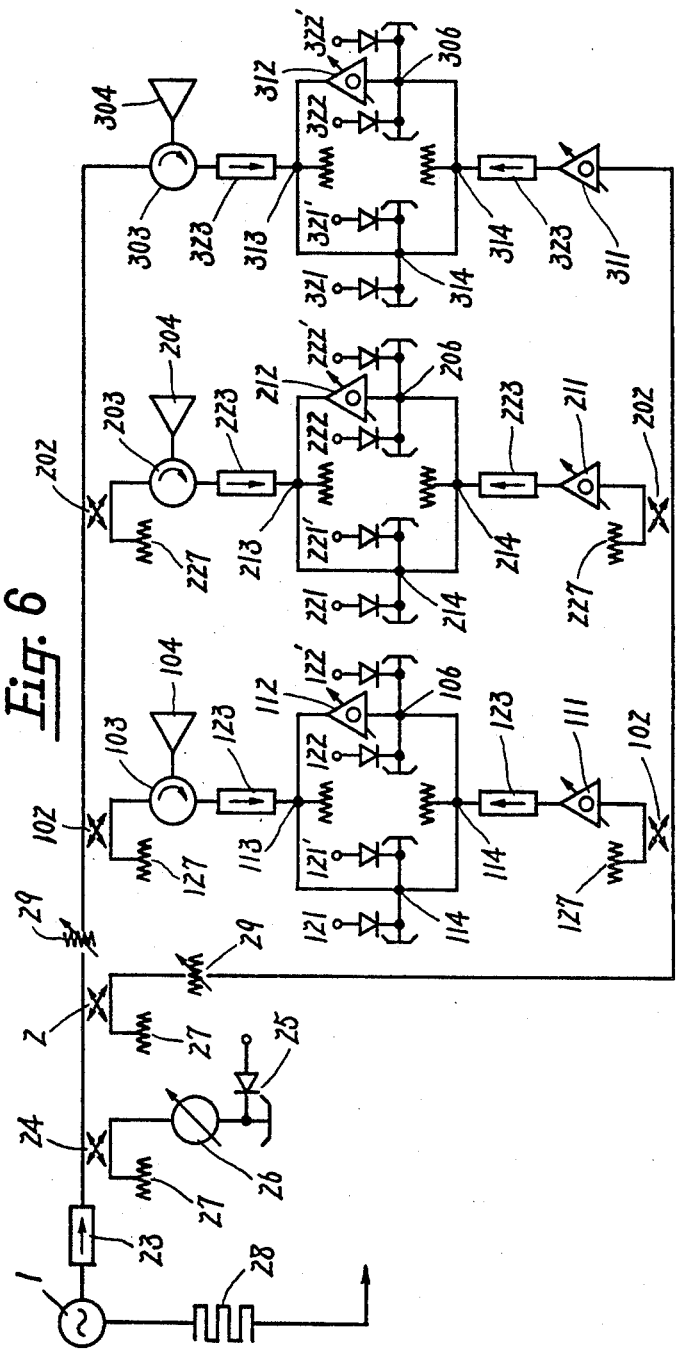
FIG. 6 shows a circuit of a three-channel microwave displacement meter for measuring local irregularities on a strip simultaneously at three points.

Examples of circuits for a microwave displacement meter used in measuring local irregularities on strips are shown in FIGS. 3 to 6. FIG. 3 shows a basis circuit with one antenna circuit. In FIG. 4, the same microwave circuit is shown in perspective. FIG. 5 shows an example of a block diagram of an electronic circuit used in FIGS. 3 and 4. FIG. 6 shows an example of a circuit for a three-channel microwave displacement measuring method in the case of setting an antenna in each of channels across a strip, that is, in the edge parts at both ends and in the middle part.

In order to judge the displacement direction ($+$ or $-$) of a strip from the antennas, there are provided a fixed or semi-fixed phase shifter 12 and a two-unit output circuit in FIG. 3. Therefore, there are required magic T's represented by 13, 14 and 15, crystal detectors 16 and 17 and output terminals 21, 21', 22 and 22'.

In order to judge the direction ($+$ or $-$) a phase difference of 90 degrees is given between the output terminals 21 and 21' and that of terminals 22 and 22'. This phase difference is adjusted previously with the phase shifter 12 so that, for example, when the output on the 21 and 21' side is $$E_1=k\cdot\cos\frac{4\pi d}{\lambda}$$

the output on the 22 and 22' side may be $$E_2=k\cdot\sin\frac{4\pi d}{4}$$

By this operation, in case the displacement $d$ increases (the strip moves away from the antenna), $E_1$ will advance by 90 degrees in the phase before $E_2$ and, in case the displacement $d$ decreases (the strip approaches the antenna), it will delay by 90 degrees. Therefore, the direction of the displacement of the strip which is the object to be measured can be definitely judged.

In FIG. 3, 1 is a usually air-cooled reflex klystron oscillating microwaves of 9.375 gHz., 23 is an isolator to regulate the advancing direction of the microwaves and to cut the reflected waves. 24 is a directional coupler to cause a resonance in the cavity frequency meter 26 with a crystal mount 25 and to detect this resonance frequency with the crystal so that the frequency may be watched. 27 is a waveguide terminal provided in an essential places and made of such bottomed tube as is shown in FIG. 4. 28 is a square wave modulator provided to modulate at 1,000 Hz. the microwave signals oscillated by the klystron 1 and to give input signals to phase sensitive detectors 33 and 43 respectively in FIG. 5. 29 is a variable attenuator for microwaves provided in an essential place.

FIG. 4 is a perspective view of the microwave circuit shown in FIG. 3. Therein the component parts are connected with wave guides.

FIG. 6 is an example of a circuit diagram wherein a three-channel antenna is set from one klystron for the three-point measurement of local irregularities on strips. Horn or palabolic antennas 104 and 304 are set in the respective edges parts of the strip and an antenna 204 is set in the middle part of the strip so that three local irregularities (that is, two frilly edges and one slack band in the strip) may be detected simultaneously. In the same drawing, the reference numerals of the levels of 100, 200 and 300 represent parts corresponding respectively to the first, second and third channels and the respective parts correspond to those in FIG. 3.

When a phase shift difference (advance or delay) of 90 degrees is given with the phase shifter 12 to the wave forms of the output $E_1$ of the terminals 21 and 21′ and the output $E_2$ of the terminals 22 and 22′, if the respective outputs are represented by $$E_1 = k \cdot \cos \varphi = k \cdot \cos \left(\frac{4\pi d}{\lambda}\right) \quad (1)$$

$$E_2 = k \cdot \sin \varphi = k \cdot \sin \left(\frac{4\pi d}{\lambda}\right) \quad (2)$$

The wave form will be of an advanced phase (corresponding to FIG. 7) or a delayed phase (corresponding to FIG. 8), as the distance $d$ between the fixed antenna 4 and strip 5 increases or decreases. In the electronic circuit block diagram in FIG. 5, the output of the terminals 21 and 21′ in FIG. 3 is made an input for a differential transformer 31 and the output of the transformer is amplified with a tuned amplifier 32 of 1000 Hz. and is made an input for the phase sensitive detector 33. Here the input of the square wave modulator 28 of 1000 Hz. shown in FIGS. 3 and 6 is introduced through a terminal 34 and irregularities are synchronously detected with these square waves. Now, if the output A of the phase sensitive detector 33 (that is, the output $E_1$ in Equation 1) is of such wave form as A in FIG. 7 in which the X-axis represents the displacement $d$ and the Y-axis represents the output and is directly made an input for an amplitude comparator 35, the obtained output B will be of a wave form B in FIG. 7. It is differentiated at 38 so as to be of positive and negative pulse wave forms C. Here, in order to elevate the detecting precision up to $\lambda/4$, if the wave form of the output A is inverted with a phase inverter 36 so as to be a wave form A′ and the amplitude comparison 37 and differentiation 39 are carried out by exactly the same operation as is mentioned above, the respective output wave forms will be B′ and C′. On the other hand, the output from the terminals 22 and 22′ is amplified with a tuned amplifier 42 of 1,000 Hz. and is detected with a phase sensitive detector 43 through a differencing transformer 41 as in FIG. 5. The output of 43 is $E_2$ in Equation 2, and is shown by X in FIG. 7. In this drawing, the waveform X advances by 90 degrees in the phase before the wave form A. One part of $E_2$ will be a wave form Y through an amplitude comparator 45 and will be made a gate signal of a differential output C for the wave form A and the other will have the phase inverted at 46, will have the amplitude compared at 47 and will be made a gate signal of a differential output C′ for the wave form A′ so as to respectively open and close the gate. The output D and D′ of the gate circuit will be combined to be such pulse signal as is shown by a wave form E, will become an input for a reversible counter 50, and will be counted as a signal corresponding to the size of a local irregularity in the strip of 8 mm. per pulse so that the absolute value of the momentary deviation of the strip may be digitally detected.

Figure 7:
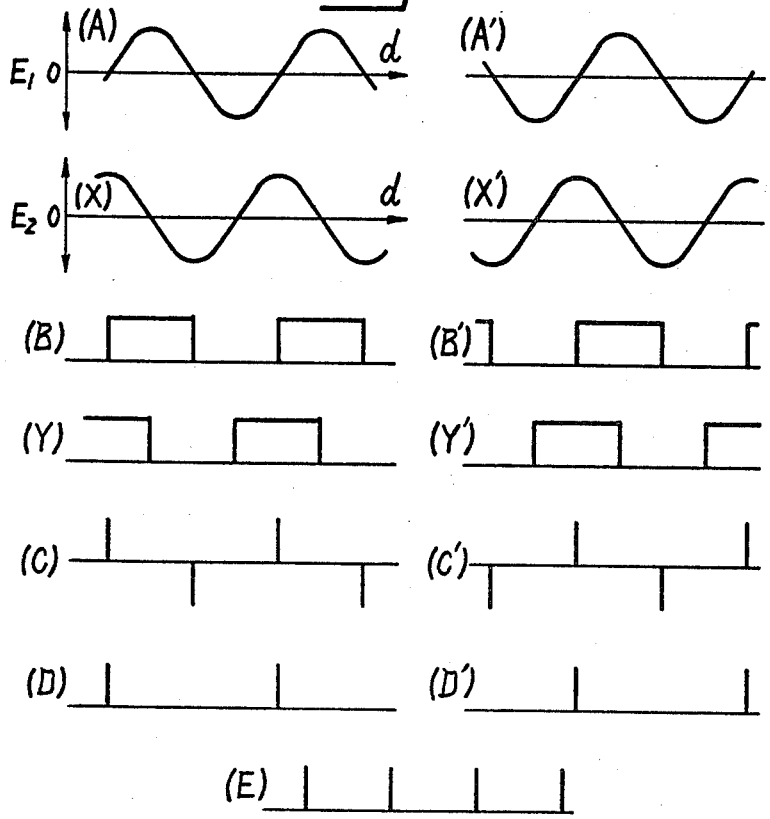
FIG. 7 is an explanatory view wave forms in respective parts of the electronic diagram in FIG. 5 and shows the case that a second input is more advanced in the phase than a first input.
Figure 12:
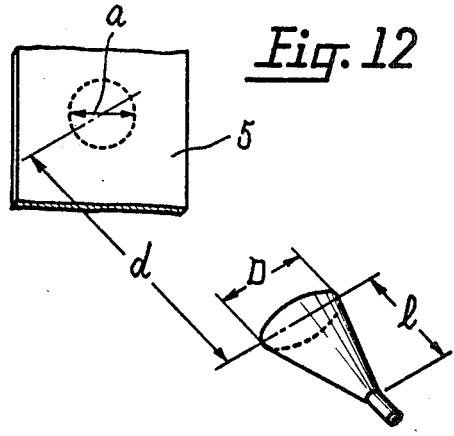
FIG. 12 is a view of relative dimensions of a horn antenna and a detecting spot.

The above mentioned explanation of the FIG. 7 is of the case that the input $E_2$ has advanced by 90 degrees in the phase before the input $E_1$. In the case of a delay of 90 degrees in the phase, the wave form will be such as is shown in FIG. 8 and the reversible counter 50 will count negative pulses.

Figure 9:
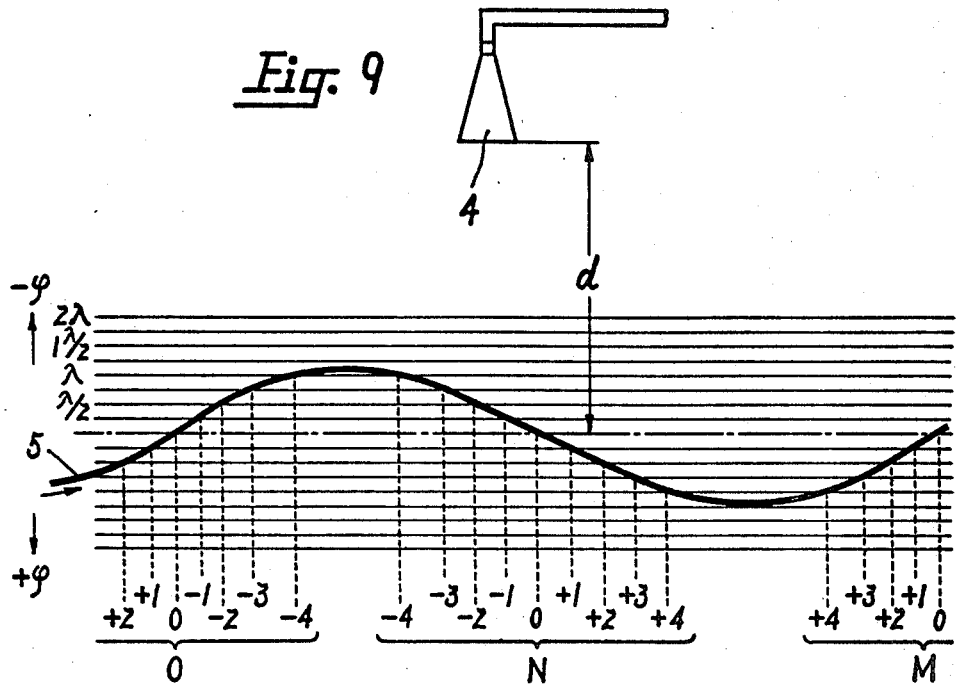
FIG. 9 is an explanatory view showing a relative relation between local irregularity on a strip and output signal.

The manner of counting pulses shall be explained with reference to FIG. 9. In the drawing, an antenna 4 is provided at a distance $d$ from the basic position of a strip 5 and the strip in which such sinusoidal local irregularity as is shown in the drawing has been produced moves in the direction indicated by the arrow (from left to right in the drawing). In case the strip is in the basic position, as shown in FIG. 7 and 8, there will be no gate signal and the output of the counter 50 will be zero. In the direction in which the strip gradually moves away from the antenna 4 as shown by M in FIG. 9, whenever the phase difference $\varphi$ deviates by $\lambda/4$, $+$ pulses will enter the counter 50 and, whenever there is a pulse input, the reversible counter will count it and will continue to count (0), (+1), (+2), (+3) and (+4). In the direction in which the strip approaches the antenna 4, that is, in the case of N in FIG. 9, whenever the phase $\varphi$ exceeds $\lambda/4$, the above mentioned counter will receive $-$ pulses, will count $(+4)+(-1)=(+3)$ for the count value of (+4) at the final point of the case of M and will continue to count (+2) ... (0) ... (−2) ... (−4) in the same manner. And then, in the case of 0 in the direction in which the strip again moves away from the antenna 4, the counter will count + pulses, will continue to count $(-4)+(+1)=(-3)$ ... (0) ... (+2) at each deviation of $\lambda/4$, that is, a pitch of 8 mm. and will issue a digital output corresponding to them.

The digital amount counted by the reversible counter 50 as explained above will be converted to an analog amount by a well known digital-analog converter 51 or will be given as a control signal for a roll crown adjusting device through an electronic computer to adjust the bending of the work roll automatically, continuously or intermittently so that a strip of a even flatness may be obtained.

Figure 10:
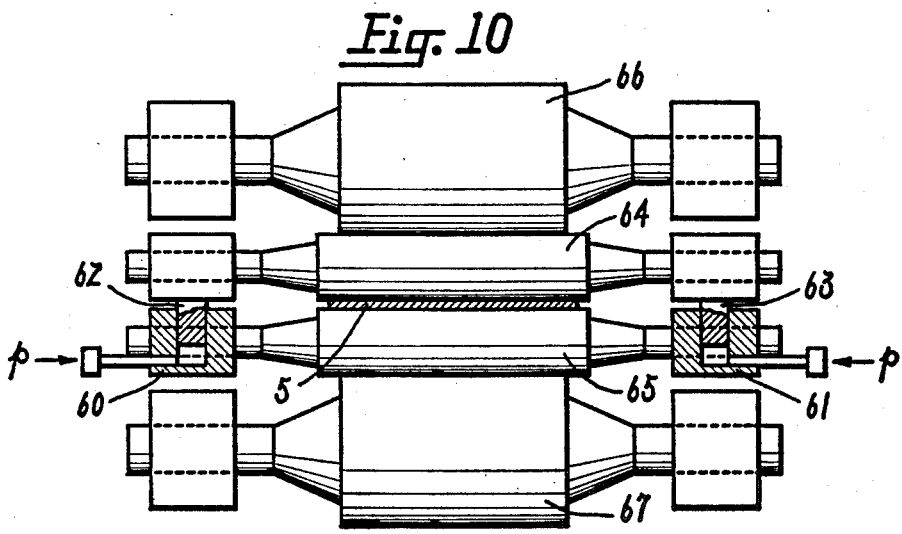
FIG. 10 is a schematic view of a known apparatus for adjusting the shape of a work roll in a four-high rolling mill.

FIG. 10 illustrates a four-high rolling mill as an example of an adjusting method. Oil pressure cylinders 62 and 63 are provided between metal chocks 60 and 61 in the rolling mill so that an oil pressure may be applied to vary the crowns of the work rolls 64 and 65 and to vary the distribution of the rolling force across the strip 5. 66 and 67 are back-up rolls for the work rolls.

Figure 11:
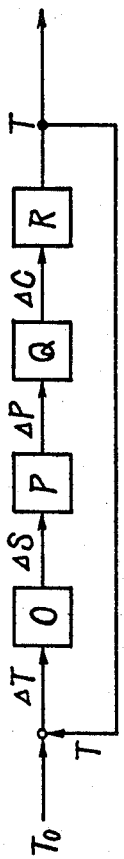
FIG. 11 is a control system diagram for controlling the flatness of a strip by combining a flatness detecting apparatus of this invention and a known roll contour adjusting apparatus.

FIGURE 11 shows a basic circuit in the case of automatically controlling the shape of the strip while being rolled by controlling the oil pressure $p$ (FIG. 10) with a detected value T by using the work roll crown adjusting apparatus shown in FIG. 10. $T_0$ is a standard value, T is a deviation amount of a detected value, 0 is a servo mechanism, P is an oil pressure mechanism for the work roll crown adjusting apparatus, Q is a crown of the work roll and R is a strip.

By the deviation $\Delta T$ between the controlled set standard value $T_0$ and the detected value T, the servo mechanism 0 will operate to vary the value of the oil pressure mechanism by $\Delta S$ so that the oil pressure $p$ of the work roll crown adjusting apparatus may vary by $\Delta P$ and the crown of the work roll may vary by $\Delta C$ which will become an input for correcting the flatness of the strip R and will be feedbacked as a detected value T. By such system, the flatness will be automatically controlled.

Now, if local irregularities at a total of three points of the middle part and both ends across the strip are detected and the respective detected amounts are $T_1$, $T_2$ and $T_3$, when the respective values of $T_1$ and $T_3$ of both end edge parts are compared with the value of $T_2$ of the middle part, if $T_1$, $T_3 > T_2$ there will be a frilly edge, if $T_2 > T_1$, $T_3$ a slack band will be found to have been produced, when $T_1 < T_2 < T_3$, the work rolls will have been more close to on the $T_3$ side and, when $T_1 > T_2 > T_3$, the work rolls will be found to have been more close to on the $T_1$ side.

By the above mentioned detected values, the direction and the amount of the control can be judged and are given as a detected value T by the roll crown adjusting apparatus.

This detected value can be also indicated by any recorder or oscilloscope for watching or recording the strip shape. It is also possible to connect the output signals to multi-trace oscilloscope and at the same time and indicate it by single sweep periodically so that the shape of any local irregularity in the strip may be projected on the surface of a Braun tube. Thus, it is very convenient to watch.

At one meter above the strip are set a plurality (three channels in the present embodiment) of horn or parabolic antennas so that the middle and both edges of the strip may be watched. The wave guides leading from the respective antennas to the circulators are water-cooled by taking into consideration the thermal influence from the strip to be measured, so that the deviation of the phase by the elongation and contraction of the wave guide may be prevented.

In the case of a continuous hot strip mill in which the moving velosity of 1800 mm. wide strip is 10 meters/sec. and the strip temperature is 800° C., it is possible to detect at a precision of 8 mm. a local irregularity produced at an amplitude of 10 to 50 mm. and a cycle of 500 to 1000 mm.

The size of a horn antenna as fixed on a strip will be determined by the spot dimension on the strip to be measured and the distance $d$ between the strip and the antenna. The relation between the diameter D of the antenna and the axis length $l$ of the horn for obtaining a spot size $a$ at an attenuation of $-10$ db when the frequency of the microwaves is 9.375 gHz. and $d=1000$ mm. can be determined in FIG. 13 and can be properly selected from the width of the strip and the size of the local irregularity to be detected so as to be a design base.

What is claimed is:

1. A method of controlling the evenness of strips comprising the steps of, in rolling a strip, projecting microwaves onto the surface of the strip by means of a plurality of antennas provided across the strip, detecting on line and in non-contact, by the phase shift of the reflected waves with respect to the oscillated waves, the size and position of any local irregularity in the strip while being continuously rolled, and indicating thus detected size and position as a control signal for a roll crown adjusting apparatus, thereby controlling the contours of the roll crowns.

2. A method of controlling the evenness of strips comprising the steps of, in rolling a strip, projecting microwaves onto the surface of the strip by means of a plurality of antennas provided across the strip, measuring the displacement variation of the surface of the strip by means of an apparatus for measuring displacement by detecting the phase shift of the reflected waves with respect to the transmitted microwaves, detecting on line and in non-contact the size, direction, shape and position of any local irregularity on the strip while being continuously rolled and thus indicating detected size, direction, shape and position as a control signal for a roll crown adjusting apparatus to correct the contours of the roll crowns.

3. An apparatus for detecting local irregularities on strips comprising antennas fixed just above the strip, means for measuring the displacement on the surface of the strip by projecting microwaves onto the surface of the strip from said antennas and detecting the phase shift of the reflected waves with respect to the transmitted microwaves, said means being set in at least three places of both edges and the middle part of the strip respectively, whereby the size, direction and position of any frilly edge or slack band in the strip may be detected in non-contact during the rolling process.

4. An apparatus for detecting local irregularities on strips according to claim 3 wherein a phase shifting means provided, said phase shifting means serving to take out, as difference of phases advanced or delayed by 90 degrees with respect to the displacement for the basic distance between the strip and the antenna, a wave form indicating a local irregularity on a strip, whereby the shape of said local irregularity produced in the strip can be detected.

5. An apparatus for detecting local irregularities on strips according to claim 3 wherein the wave form indicating a local irregularity on a strip as a phase shift of microwaves is converted by 180 degrees in the phase, whereby the precision of detecting local irregularities on the strip can be increased by $\lambda/4$ (wherein $\lambda$ is one wave length of the microwaves).

6. An apparatus for detecting local irregularities on strips according to claim 3 wherein, for the detection of local irregularities in a strip of a wave height of 50 to 100 mm., the frequency of the microwaves is made 9.375 gHz. and the detection precision is made a practically satisfactory range of 8 mm.

7. An apparatus for detecting local irregularities on strips according to claim 3 wherein the wave form taken out as a phase shift of microwaves in response to a local irregularity on a strip is made a positive or negative pulse signal and said pulses are counted, whereby the wave height value of the local irregularity on the strip can be indicated digitally or with an analog amount.

8. An apparatus for detecting local irregularities on strips according to claim 3 wherein a local irregularity on a strip is simultaneously detected at a plural points across the strip and said detected results are introduced onto a brawn tube or a recording meter, whereby the shape of local irregularities produced on the strip can be graphically reproduced.

References Cited

UNITED STATES PATENTS

| | | | |
|---|---|---|---|
| 2,792,730 | 5/1957 | Cozzo | 72—12 |
| 3,228,219 | 1/1966 | Fox | 72—16 |
| 3,318,124 | 5/1967 | Plaisted | 72—8 |

MILTON S. MEHR, Primary Examiner

U.S. Cl. X.R.

73—159